US012060198B2

(12) United States Patent
Hsu

(10) Patent No.: US 12,060,198 B2
(45) Date of Patent: Aug. 13, 2024

(54) LIQUID CONTAINER MADE ENTIRELY FROM NATURAL PLANT MATERIALS

(71) Applicant: Yu-Ting Hsu, Taipei (TW)

(72) Inventor: Yu-Ting Hsu, Taipei (TW)

( * ) Notice: Subject to any disclaimer, the term of this patent is extended or adjusted under 35 U.S.C. 154(b) by 261 days.

(21) Appl. No.: 17/501,826

(22) Filed: Oct. 14, 2021

(65) Prior Publication Data

US 2022/0127037 A1 Apr. 28, 2022

(30) Foreign Application Priority Data

Oct. 22, 2020 (TW) .................................. 109136629

(51) Int. Cl.
*B65D 3/04* (2006.01)
*B65D 3/16* (2006.01)
*B65D 3/22* (2006.01)

(52) U.S. Cl.
CPC .................. *B65D 3/04* (2013.01); *B65D 3/16* (2013.01); *B65D 3/22* (2013.01)

(58) Field of Classification Search
CPC ............... B65D 3/04; B65D 3/16; B65D 3/22
See application file for complete search history.

(56) References Cited

U.S. PATENT DOCUMENTS 9,505,521 B2 * 11/2016 Berk ......................... D21J 1/04

* cited by examiner

*Primary Examiner* — Anthony D Stashick
*Assistant Examiner* — L Kmet
(74) *Attorney, Agent, or Firm* — Chun-Ming Shih; LANWAY IPR SERVICES

(57) ABSTRACT

A liquid container made entirely from natural plant materials is revealed. The liquid container includes a cap and an upper portion made from plant fiber by mold injection, a body made of a spiral paper tube having at least two-layer structure, and a base produced by molding of composite paper. The body and the base are connected by adhesives. A fastening member is disposed on an area where the upper portion and the body are connected for improving reliability and structural strength of the area while a mounting groove formed by rolling is arranged at an area where a bottom end of the body and the base are connected by adhesives. The fastening member and the mounting groove improve connection reliability and structure strength. The liquid container with excellent structural strength is more resistant to pressure in radial and longitudinal directions and used to fill pressurized beverages or liquid such as carbonated drinks.

4 Claims, 8 Drawing Sheets

LIQUID CONTAINER MADE ENTIRELY FROM NATURAL PLANT MATERIALS

BACKGROUND OF THE INVENTION

Field of the Invention

The present invention relates to a liquid container, especially to a liquid container made entirely from natural plant materials.

Description of Related Art

The most common container for drinks on the market is plastic bottles (or PET bottle). A main raw material mainly for conventional plastic bottles is polyethylene terephthalate (PET). The PET bottles are mass-produced and widely used globally. Since the PET bottles are non-degradable, how to deal with waste PET bottles has become an environmental issue for countries all over the world now.

In order to protect the environment from pollution caused by plastic bottles, containers made from biodegradable and green materials have been developed and put into mass production. Suppliers in America, England, Holland, Denmark, etc. provide integrally molded paper bottles. Although the paper bottles are produced quickly and conveniently, they have shortcomings of insufficient structural strength and compressive strength. Thus paper bottles are easy to break at fragile portion and unable to be used as soda bottles which is used to fill pressurized beverages or liquid such as soda water.

SUMMARY OF THE INVENTION

Therefore, it is a primary object of the present invention to provide a liquid container made entirely from natural plant materials for solving insufficient structural strength and compressive strength problems of integrally molded paper bottles and addressing environmental issues caused by conventional plastic bottles and paper containers.

In order to achieve the above object, a liquid container made entirely from natural plant materials according to the present invention includes a cap, an upper portion, a body, and a base. A mouth is disposed on a top of the upper portion for connection with the cap and a periphery of the upper portion is extended downward to form a connection segment capable of being mounted into a top end of the body. Both the cap and the upper portion are made from a mixture mainly formed by plant fiber and produced by mold injection. The body is made of a spiral paper tube with at least two layers while the top end of the body and the connection segment of the upper portion are adhered and connected by adhesives. The base is a cup with an opening facing downward and composed of a bottom surface and a cylindrical wall around the bottom surface. The base with the opening facing downward is mounted into a bottom end of the body and the cylindrical wall of the base is connected to the body by adhesives. The base is produced by molding of composite paper with at least two layer and the respective layers of the composite paper have different fiber orientations.

A fastening member which is arranged at a connection area between the upper portion and the top end of the body is composed of an inner projection protruding from a top end of the body toward an inner surface of the body and a groove which is arranged at an outer surface of the connection segment of the upper portion, corresponding to the inner projection, and located around the connection segment. The inner projection is mounted in and attached to the groove firmly.

A mounting groove formed by rolling is arranged at an area where the bottom end of the body and the cylindrical wall of the base are connected by adhesives. The mounting groove is concave toward a center of the body and located around the body.

The mixture which mainly contains plant fiber includes natural plant fiber powder and plant-based adhesive.

The natural plant fiber powder is made from bamboo bark while the plant adhesive includes natural resin and pine sap.

The present liquid container made entirely from natural plant materials features on that the 100% plant made container in combination with special design in structure provides excellent structural strength so that the liquid container is more resistant to pressure in radial or longitudinal direction and capable of being used to fill pressurized beverages or liquid such as carbonated drinks.

DETAILED DESCRIPTION OF THE PREFERRED EMBODIMENT

Figure 1:
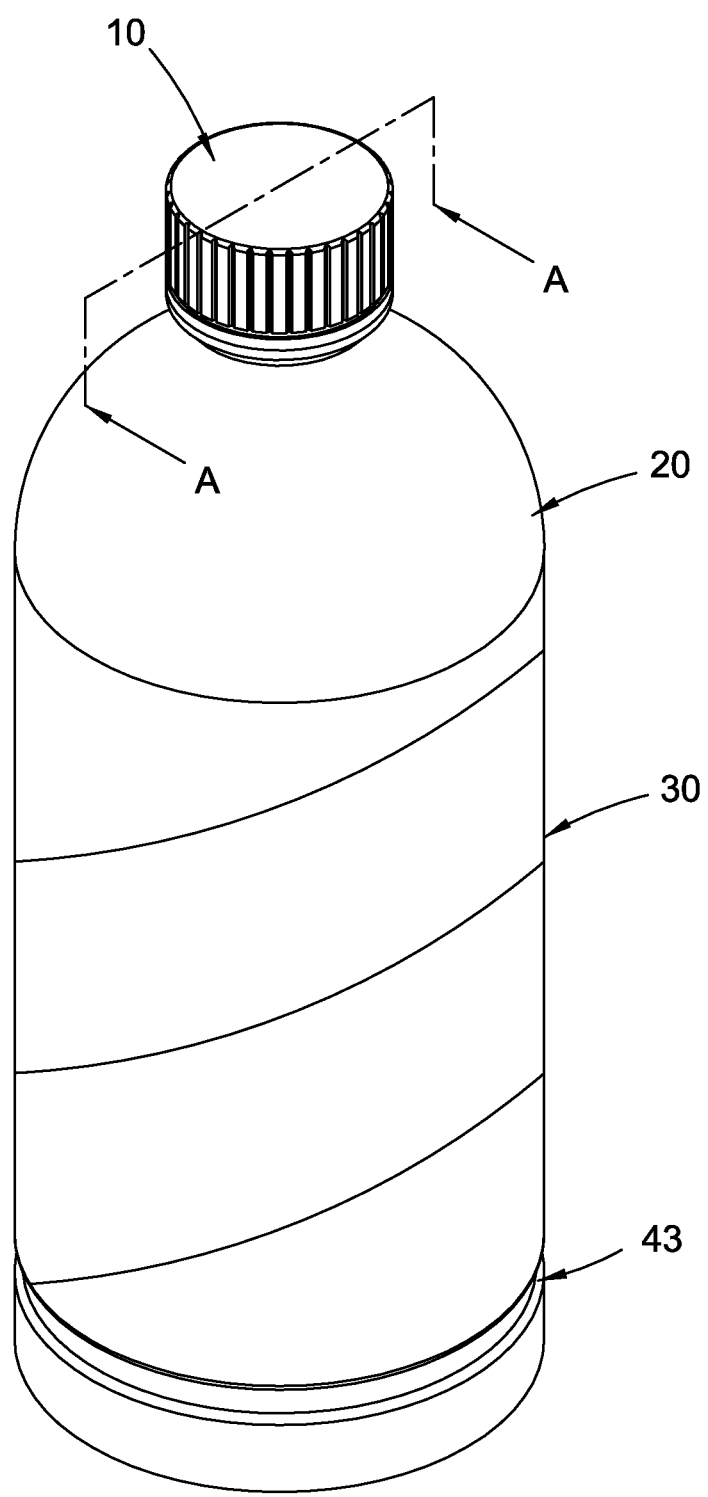
FIG. 1 is a perspective view of an embodiment of a liquid container made entirely from natural plant materials according to the present invention.
Figure 2:
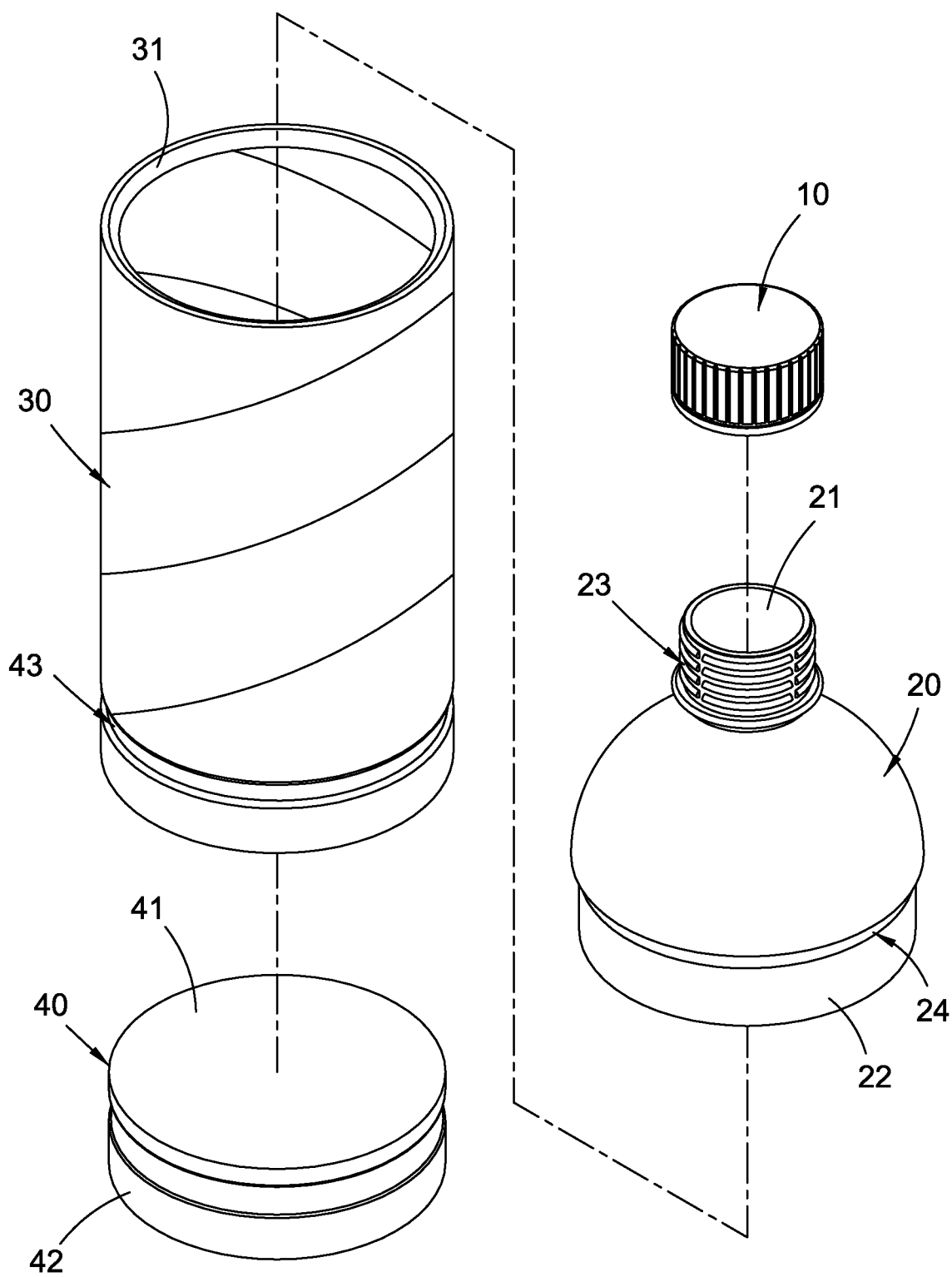
FIG. 2 is an exploded view of the embodiment in FIG. 1 according to the present invention.
Figure 3:
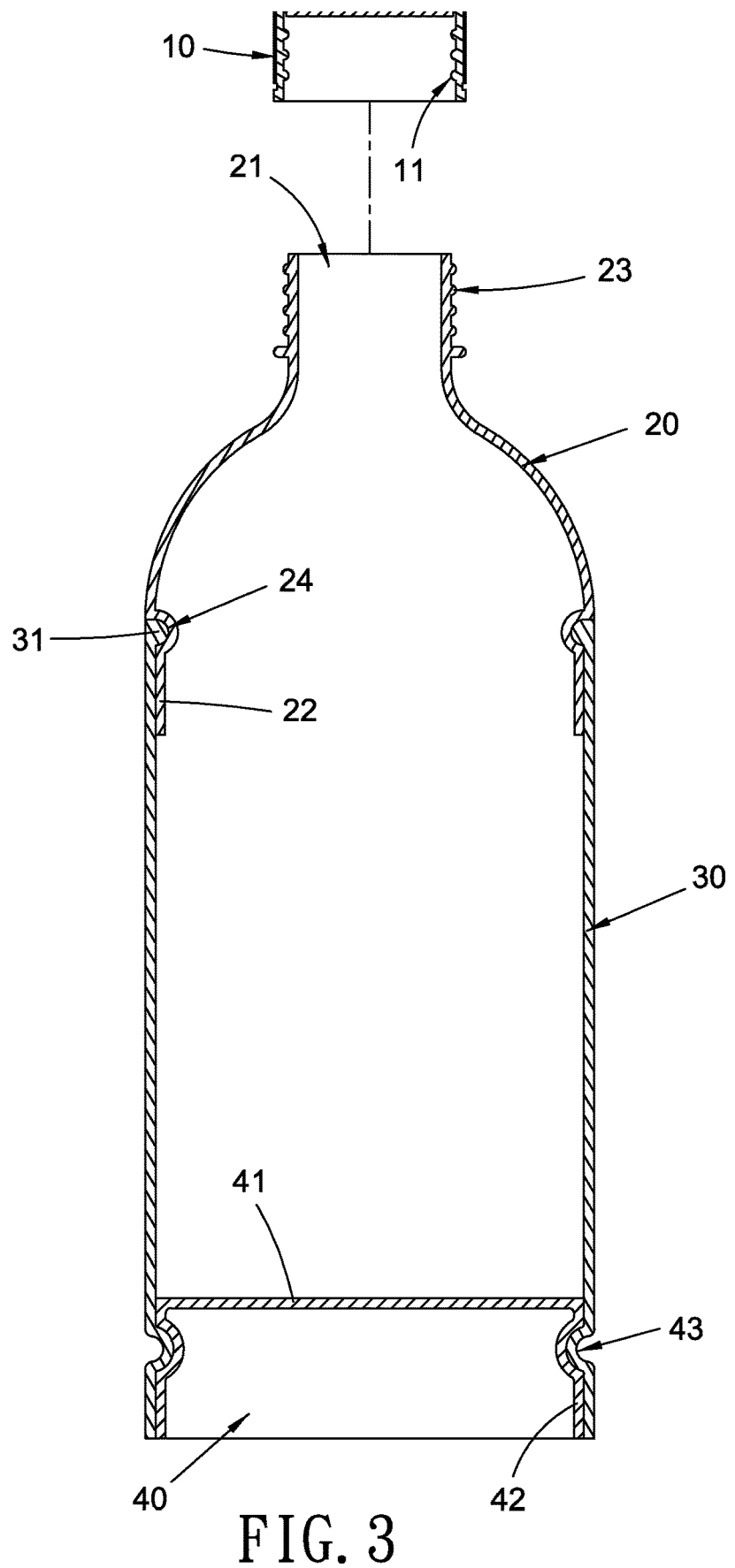
FIG. 3 is a sectional view of the embodiment in FIG. 1 along line A-A in which a cap and an upper portion are separated from each other according to the present invention.
Figure 4:
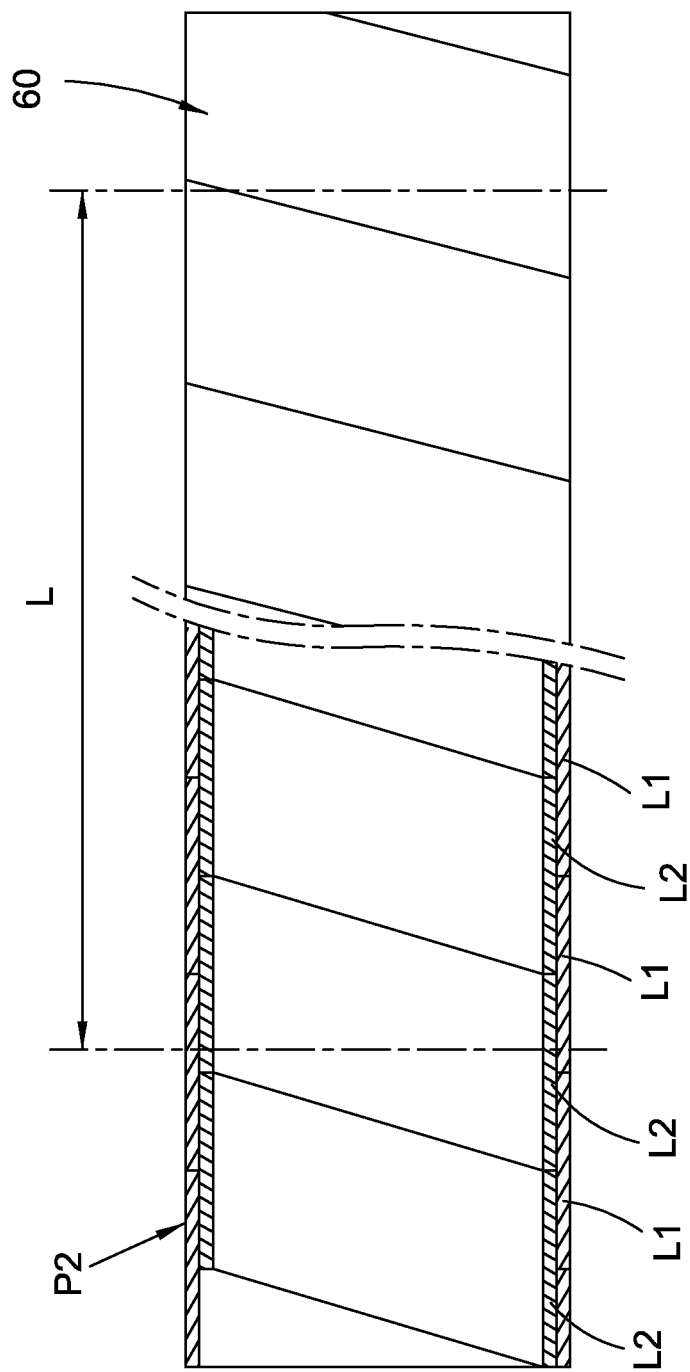
FIG. 4 is a schematic drawing showing a spiral paper tube made of composite paper with two-layer structure of an embodiment according to the present invention.

Refer to FIG. 1, FIG. 2, and FIG. 3, a perspective view, an exploded view, and a sectional view of an embodiment of a liquid container made entirely from natural plant material are revealed. The liquid container made entirely from natural plant materials according to the present invention includes a cap 10, an upper portion 20, a body 30, and a base 40. A mouth 21 is disposed on a top of the upper portion 20 for connection with the cap 10 and a periphery of the upper portion 20 is extended downward to form a connection segment 22 capable of being mounted into a top end of the body 30. Both the cap 10 and the upper portion 20 are made from a mixture mainly formed by plant fiber and are produced by mold injection. The mixture mainly formed by plant fiber basically includes natural plant fiber powder and plant-based adhesive. The natural plant fiber powder is preferably made from bamboo bark and the plant adhesive includes natural resin and pine sap. The natural plant materials are naturally degradable or bio-degradable, without environmental issues caused by traditional PET bottles. The body 30 is made of a spiral paper tube 60 with at least two layers (as shown in FIG. 4). The top end of the body 30 and the connection segment 22 of the upper portion 20 are adhered and connected by adhesives. For example, the adhesive is made of biodegradable polylactide (PLA).

The shape of the upper portion 20 is not limited and usually determined according to types and uses of the liquid container. Basically the upper portion 20 is a tube having two ends communicating with each other. In FIG. 1, the upper portion 20 shown is a conical component with a tube on the top thereof, but not limited. The connection between the cap 10 and the mouth 21 depends on types and uses of the liquid container. In the embodiment shown in FIG. 1, the upper portion 20 is provided with outer threads close to the mouth 21 while an inner cylindrical surface of the cap 10 is provided with inner threads 11 mated with the outer threads 23 (as shown in FIG. 3). Thus the cap 10 is connected to the upper portion 20 by the inner threads 11 and the outer threads 23 threaded and engaged with each other.

Figure 6:
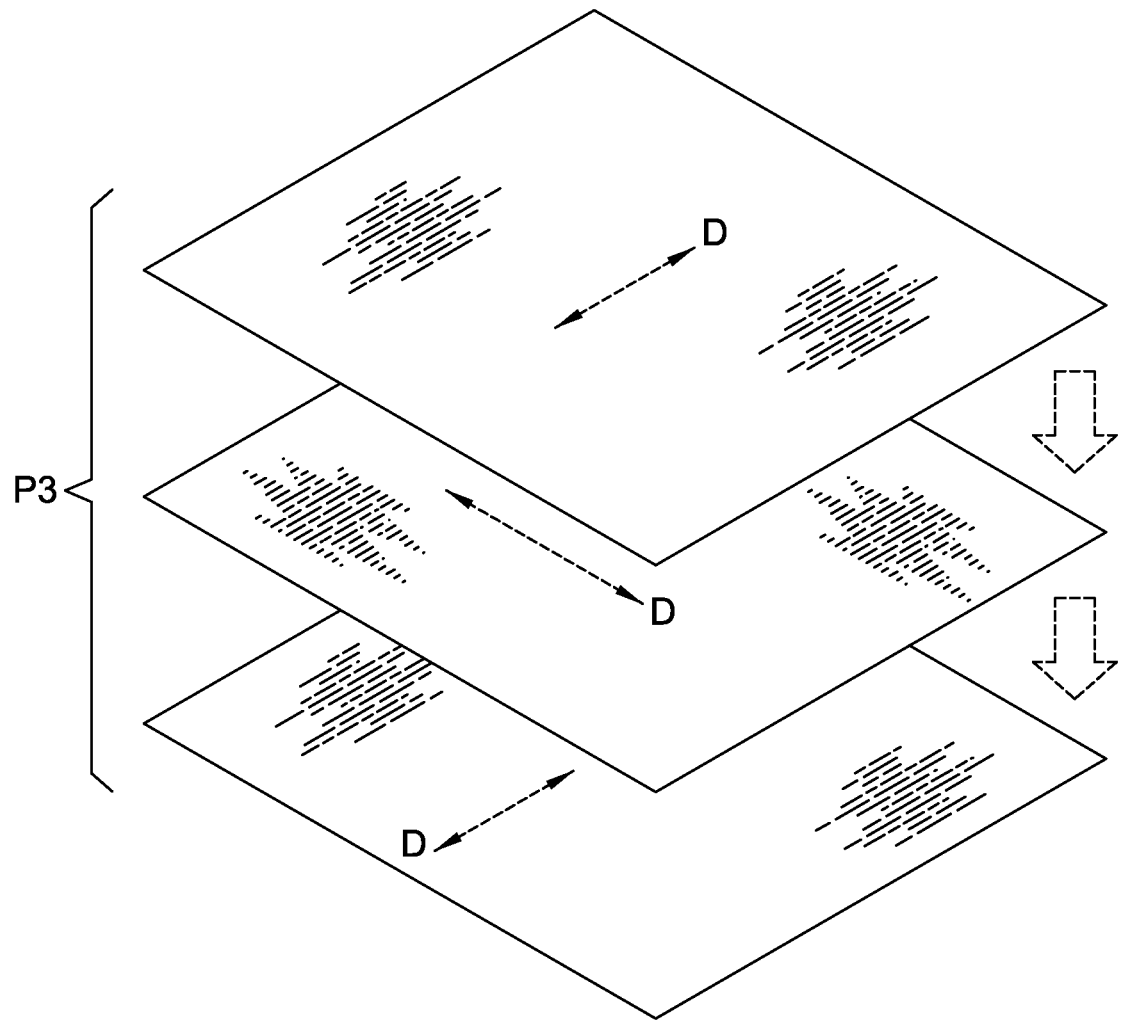
FIG. 6 is a schematic drawing showing three-layer composite paper used to produce a base of an embodiment according to the present invention.
Figure 7:
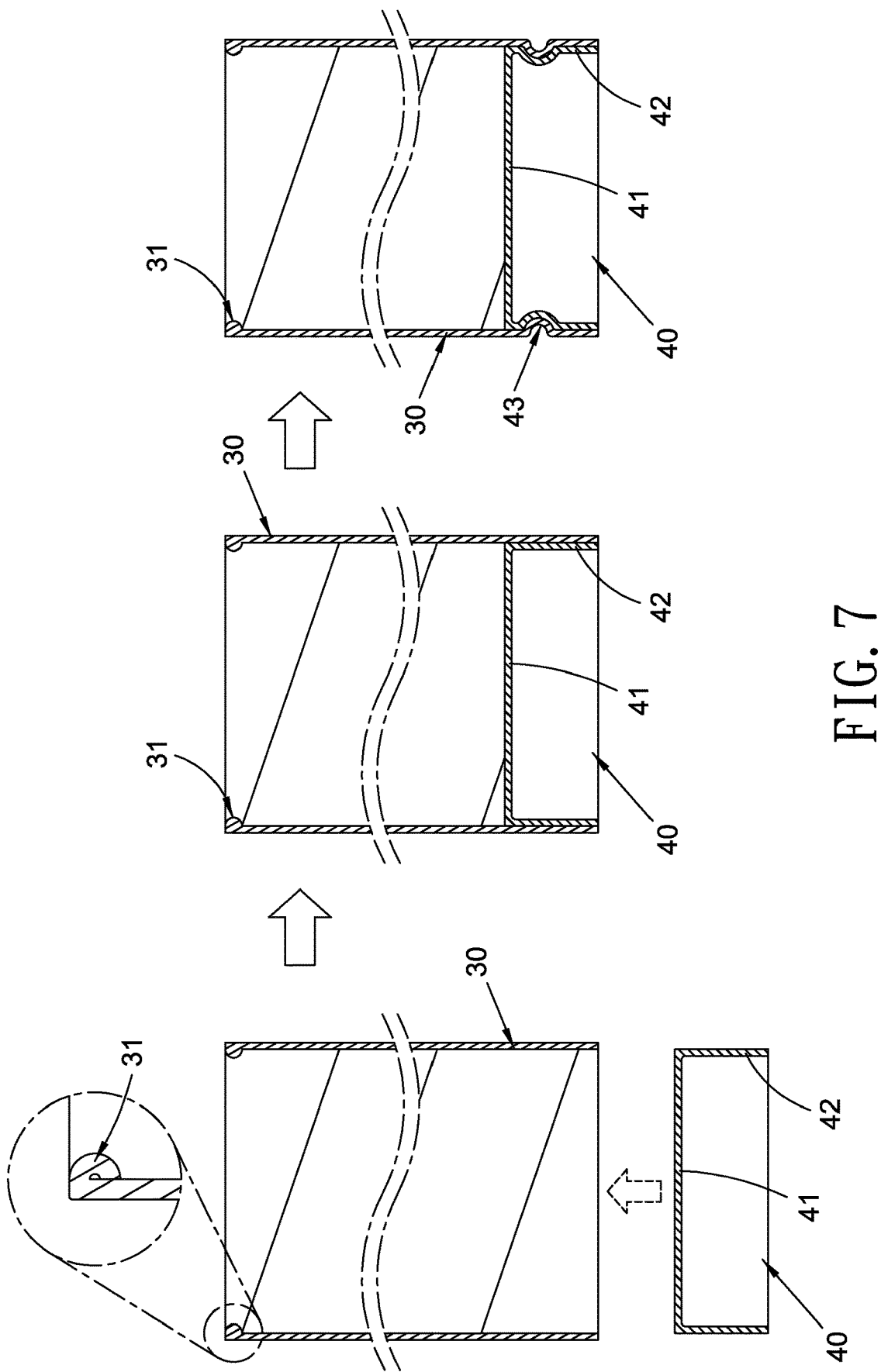
FIG. 7 are schematic drawings showing how a base is mounted into a body of an embodiment according to the present invention.

The base 40 is a cup with an opening facing downward and composed of a bottom surface 41 and a cylindrical wall 42 around the bottom surface 41. As shown in FIG. 7, the base 40 with the opening facing downward is mounted into a bottom end of the body 30 and the cylindrical wall 42 of the base 40 is connected to the body 30 by adhesives. The base 40 is produced by molding of three-layer composite paper P3. Refer to FIG. 6, in a preferred embodiment, the respective layers of the three-layer composite paper P3 have different fiber orientations D (the directions indicated by arrows in the figure). The base 40 made of the composite paper P3 have higher structural strength and better compressive strength.

Refer to FIG. 3, in a preferred embodiment of the present invention, a mounting groove 43 formed by rolling is arranged at an area where the bottom end of the body 30 and the cylindrical wall 42 of the base 40 are connected by adhesives. The mounting groove 43 is concave toward a center of the body 30 and located around the body 30 for increasing reliability and structural strength of the body 30 connection with the base 40.

Figure 8:
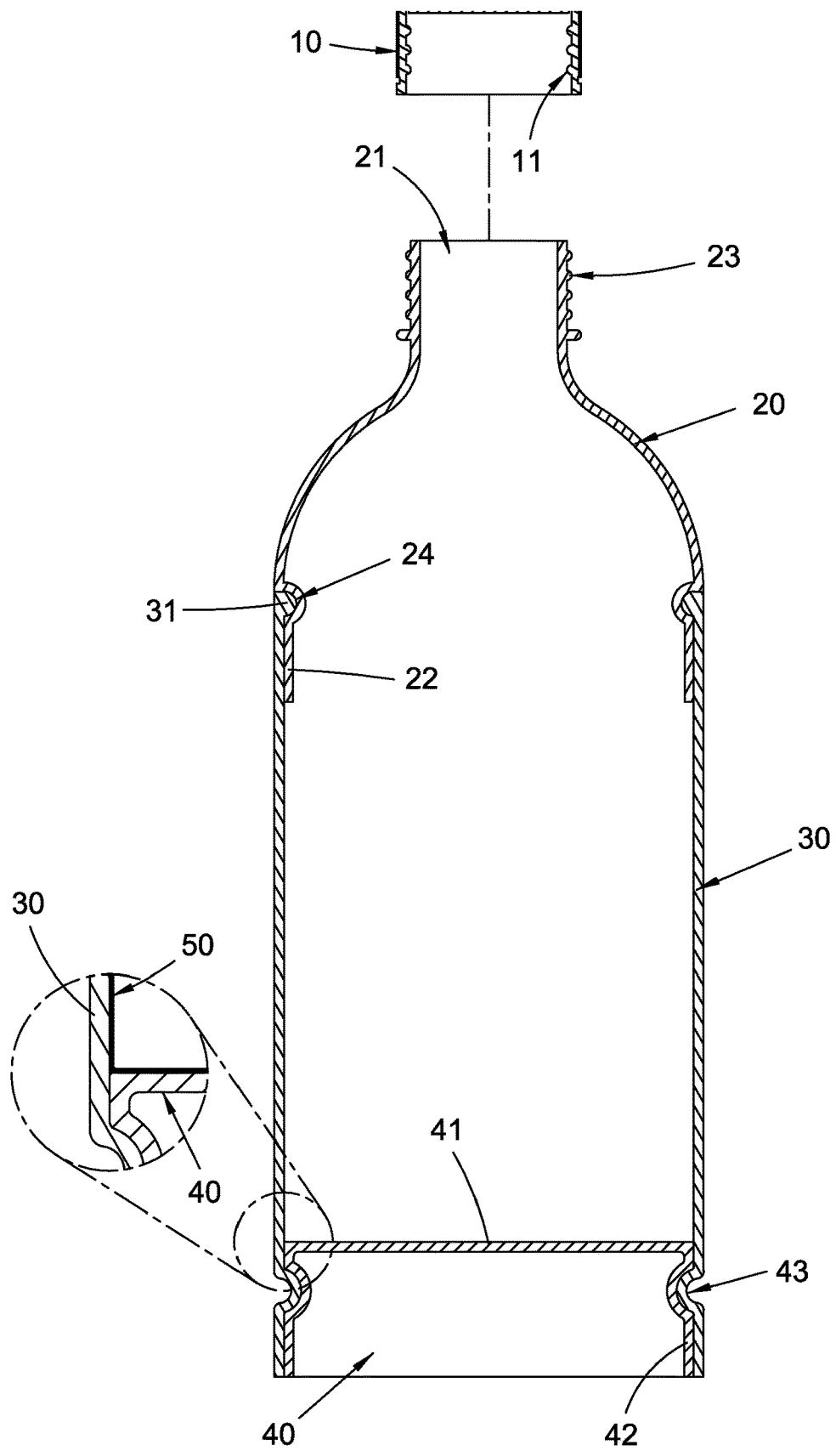
FIG. 8 is a sectional view of another embodiment according to the present invention.

Refer to FIG. 8, in a preferred embodiment of the present invention, a fastening member is used to connect the upper portion 20 and the top end of the body 30 for improving reliability and structural strength of the upper portion 20 connected with the body 30. The fastening member includes an inner projection 31 protruding from the top end of the body 30 toward an inner surface of the body 30 and a groove 24 which is arranged at an outer surface of the connection segment 22 of the upper portion 20, corresponding to the inner projection 31, and located around the connection segment 22. The inner projection 31 is formed by curving paper material on the top end of the body 30 inward, as shown in FIG. 7. The inner projection 31 is mounted in and attached to the groove 24 firmly, as shown in FIG. 3. The body 30 is made of the spiral paper tube with multi-layer structure having excellent structural strength so that the body 30 is more resistant to pressure and tension in radial or longitudinal direction. The top end and the inner projection 31 of the body 30 are fastened tightly around the connection segment 22 to prevent loosening, falling or deformation so that the bottle can be used to fill pressurized beverages or liquid such as carbonated drinks and meet product standards and requirements of polyethylene terephthalate (PET) bottles including strength required and no leak in two years.

In a preferred embodiment of the present invention, the body 30 is made of composite paper with at least two layers. The number after the composite paper P represents the number of the layers the composite paper has. For example, the composite paper with two-layer structure is labelled as P2. Refer to FIG. 4, a structure of a spiral paper tube 60 made of the composite paper P2 with two layers is revealed. The spiral paper tube 60 is cut according to the length L of the body 30 for production of the body 30. The composite paper P2 with two-layer structure includes a first layer of paper L1 and a second layer of paper L2. The composite paper P2 is wound in a spiral way while the first layer of paper L1 and the second layer of paper L2 are adhered to each other in a staggered manner so as to form a two-layer spiral paper tube 60 used as the body 30. The adhesive used is also the biodegradable PLA. The first layer of paper L1 forms an outer layer of the body 30 while the second layer of paper L2 forms an inner layer of the body 30.

In a preferred embodiment of the present invention, a layer of waterproof coating 50 made of biodegradable plastic (as shown in FIG. 8) is coated on an inner surface of the present liquid container after the cap 10, the upper portion 20, the body 30, and the base 40 being assembled into the liquid container. The biodegradable plastic can be PLA for improving waterproof property of the present liquid container entirely made from natural plant materials.

Figure 5:
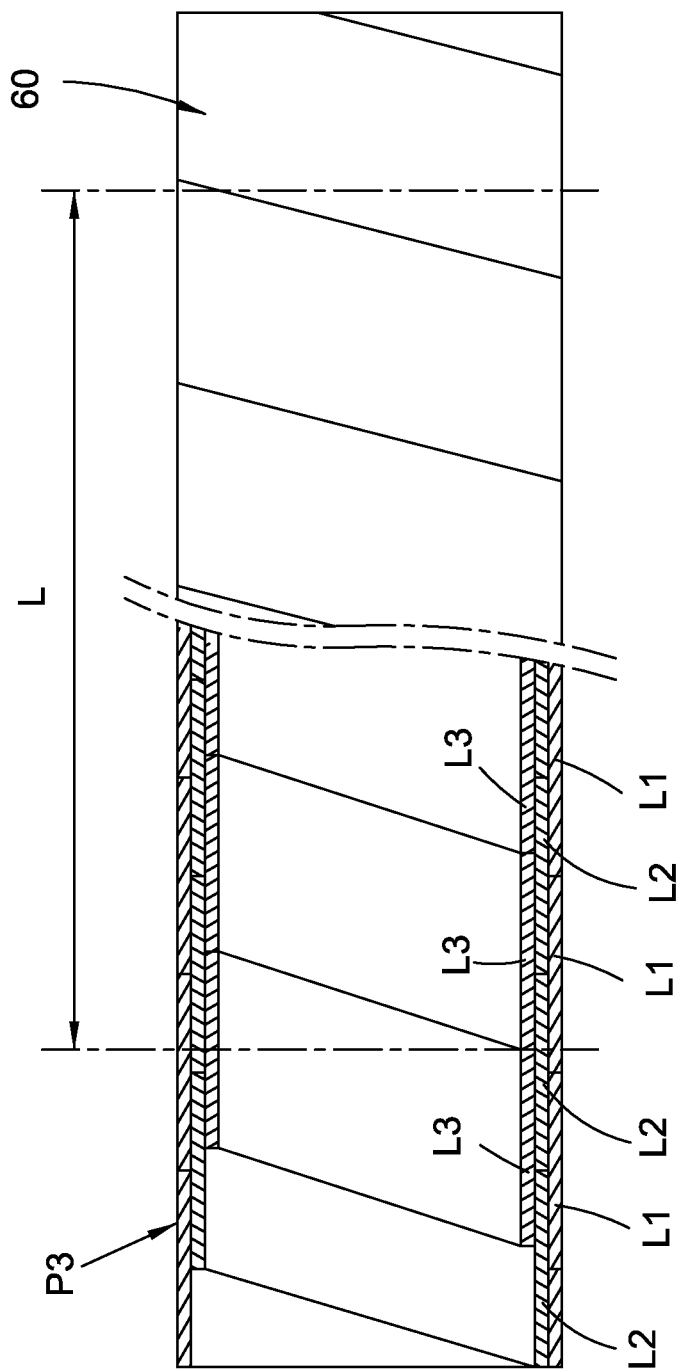
FIG. 5 is a schematic drawing showing a spiral paper tube made of composite paper with three-layer structure of an embodiment according to the present invention.

Besides the above embodiment made of the composite paper P2 with two-layer structure, the body 30 can be made of the composite paper with multi-layer structure which is more than two layers in other embodiments. Thus the structural strength of the body 30 is further increased. Refer to FIG. 5, a spiral paper tube 60 made of composite paper P3 with three-layer structure is revealed. Then The spiral paper tube 60 is cut according to the length L of the body 30 for production of the body 30. The composite paper P3 with three-layer structure includes a first layer of paper L1, a second layer of paper L2, and a third layer of paper L3. The composite paper P3 is wound in a spiral way while the first layer of paper L1, the second layer of paper L2, and the third layer of paper L3 are adhered to one another in a staggered manner so as to form a three-layer spiral paper tube 60 used as the body 30. The first layer of paper L1 forms an outer layer of the body 30, the second layer of paper L2 forms an intermediate layer of the body 30, and the third layer of paper L3 forms an inner layer of the body 30. The material for the third layer of paper L3 as the inner layer of the body 30 is selected according to types of the liquid contained in the liquid container or uses of the liquid container. In a preferred embodiment, fibers of the respective layers of the above composite paper with multi-layer structure are arranged at different directions so that the structural strength and compressive strength of the body 30 are increased.

In a further embodiment, aluminum foil is attached to an inner surface of the body 30 for blocking ultraviolet rays.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A liquid container made entirely from natural plant materials comprising: a cap, an upper portion, a body, and a base; wherein a mouth is disposed on a top of the upper portion for connection with the cap and a periphery of the upper portion is extended downward to form a connection segment capable of being mounted into a top end of the body; the cap and the upper portion are both made from plant fiber powder with adhesives and produced by mold injection; wherein the body is made of a spiral paper tube with three layers while the top end of the body and the connection segment of the upper portion are adhered and connected by adhesives; wherein the base is a cup with an opening facing downward and having a bottom surface and a cylindrical wall around the bottom surface; the base with the opening facing downward is mounted into a bottom end of the body and the cylindrical wall of the base is connected to the body by adhesive; the base is produced by molding of composite paper with three layers and the respective layers of the composite paper have different fiber orientations.

2. The liquid container made entirely from natural plant materials as claimed in claim 1, wherein a fastening member is disposed on a connection area between the upper portion and the top end of the body and including an inner projection protruding from a top end of the body toward an inner surface of the body, and a groove which is arranged at an outer surface of the connection segment of the upper portion, corresponding to the inner projection, and located around the connection segment; the inner projection is mounted in and attached to the groove firmly.

3. The liquid container made entirely from natural plant materials as claimed in claim 1, wherein a mounting groove formed by rolling is arranged at an area where the bottom end of the body and the cylindrical wall of the base are connected by adhesive; the mounting groove is concave toward a center of the body and located around the body.

4. The liquid container made entirely from natural plant materials as claimed in claim 1, wherein the natural plant fiber powder is made from bamboo bark while the adhesive is selected from the group consisting of natural resin and pine sap.

* * * * *